July 19, 1960 J. A. WIORA 2,945,277
HOSE CLAMP
Filed April 2, 1958
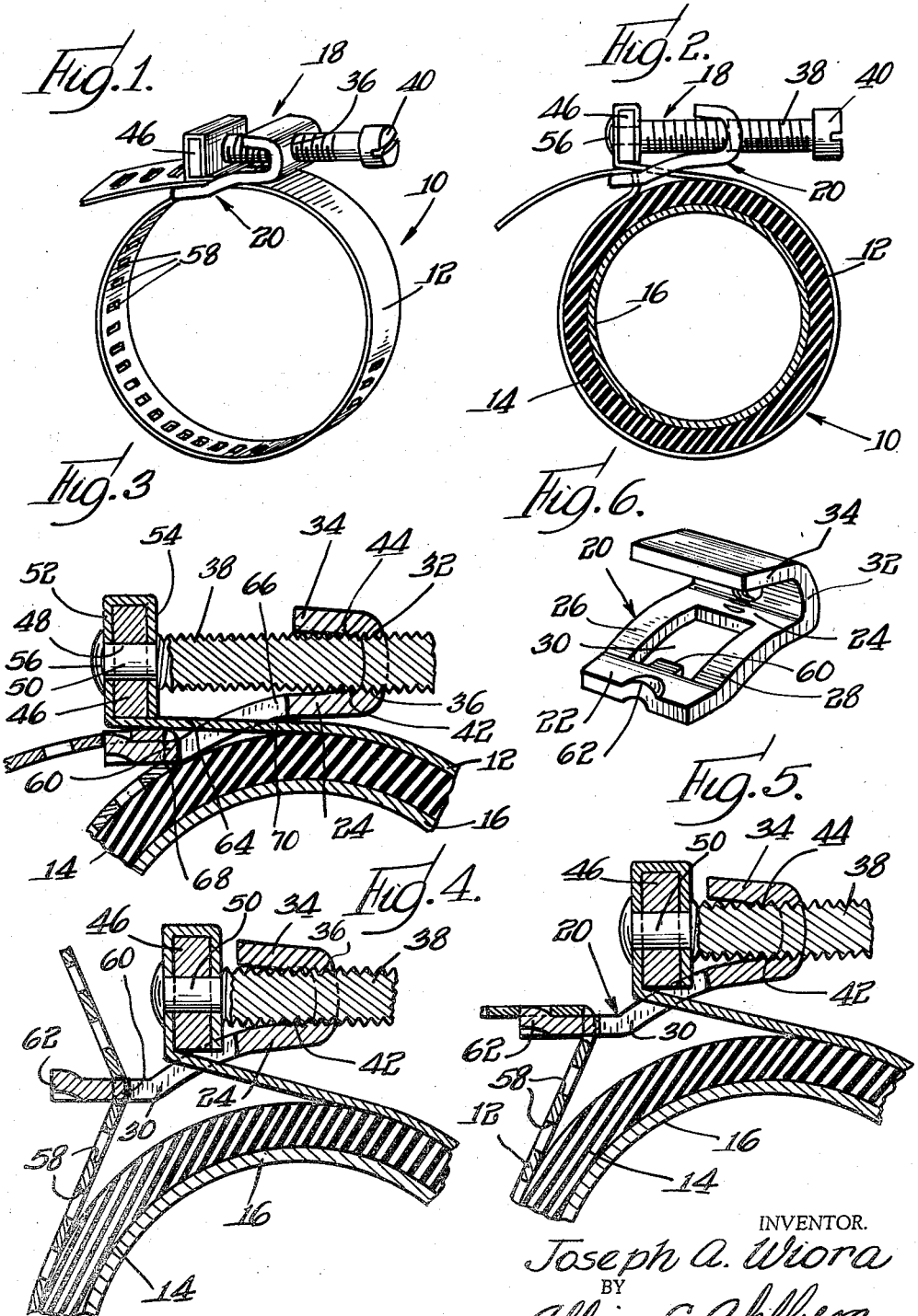
INVENTOR.
Joseph A. Wiora
BY
Albin C. Ahlberg
Atty.

United States Patent Office 2,945,277
Patented July 19, 1960

2,945,277

HOSE CLAMP

Joseph A. Wiora, Almond, Wis., assignor to Wiora Products Corporation, Almond, Wis., a corporation of Wisconsin Filed Apr. 2, 1958, Ser. No. 725,974

4 Claims. (Cl. 24—281)

The present invention relates to a novel hose fastening device, and more particularly to a novel hose clamp. Numerous hose clamps have heretofore been proposed for securing and sealing the end of a hose to a suitable nipple or pipe section. While many of these heretofore proposed devices have been generally suitable for various purposes, they have frequently been relatively expensive or difficult to apply or unable to provide a connection capable of withstanding higher fluid pressures. Certain of the heretofore proposed clamps have included a looped band having overlapping end portions, and means including a bolt or screw for relatively shifting the overlapping end portions past each other for tightening the band. Such heretofore proposed bolt-type hose clamps are more economical than other types of prior clamps but are frequently constructed so that undue friction is developed during tightening thereof which, as indicated above, makes proper tightening of the clamp relatively difficult.

An important object of the present invention is to provide a novel hose clamp which is constructed so that it may be more easily applied to and tightened against a hose for providing a secure and sealed connection between the hose and any desired complementary member inserted into the hose.

A more specific object of the present invention is to provide a novel bolt-type hose clamp having a band or strap with overlapping portions, which clamp is constructed so as to minimize substantially undue friction between portions thereof in order to facilitate proper application of the hose clamp to a workpiece or hose.

Still another object of the present invention is to provide a novel hose clamp of the above described type which may be quickly and easily applied to hoses having a wide variety of diameters, said hose clamp being further constructed so that it may be easily secured in assembled relationship in a hose prior to a final tightening operation.

Still another object of the present invention is to provide a novel hose clamp of the above described type which is of simple, economical and rugged construction.

Other objects and advantages of the present invention will become apparent from the following description and the accompanying drawings wherein:

Fig. 1 is a perspective view showing a hose clamp incorporating the features of the present invention;

Fig. 2 is a sectional view showing a clamp incorporating features of the present invention applied to, but not fully tightened against a hose which has been assembled over a suitable pipe section or fitting;

Fig. 3 is an enlarged fragmentary partial sectional view showing the clamp structure fully tightened against a workpiece or hose;

Fig. 4 is a fragmentary partial sectional view showing the hose clamp structure in an initial stage of assembly with the hose;

Fig. 5 is a view similar to Fig. 4 and shows the hose clamp structure in condition to be tightened upon the workpiece or hose; and Fig. 6 is a perspective view showing an element of a hose clamp structure incorporating features of the present invention.

Referring now more specifically to the drawings, wherein like parts are designated by the same numerals throughout the various figures, a clamping device 10 incorporating features of the present invention includes an elongated flexible strap or band 12 which is adapted to encircle any desired workpiece such as a hose 14. While various uses for a clamping device of the type contemplated herein may suggest themselves, the device is especially suitable for securing and sealing the hose 14 to a suitable pipe section or fitting 16 so as to provide a fluid-tight connection. The said flexible band 12 may be formed from steel or any other suitable material having the desired characteristics. The clamping device 10 is provided with securing means 18 associated with opposite end portions of the band 12 in a manner which enables the end portions to be relatively drawn past each other for reducing the diameter of a looped portion of the band surrounding the workpiece for tightening the band against the workpiece.

The securing means 18 is provided with a bracket member 20 which may be economically formed from sheet metal or from any other desired material. The bracket member has a base portion which includes opposite end sections 22 and 24 and intermediate sections 26 and 28. Inner margins of these sections define a central aperture 30 through which opposite end portions of the band 12 are adapted to extend, in a manner described more in detail below. It is to be noted that the opposite end sections 22 and 24 of the bracket base portion are disposed in substantially parallel laterally offset planes, and the intermediate connecting sections 26 and 28 extend diagonally between the end sections 22 and 24. The intermediate sections are shaped so as to conform generally with the contour of the workpiece or hose 14 to which the clamping device is to be applied. As will be discussed more fully below, this structure promotes easier and more secure application of the clamping device to the workpiece.

The bracket member 20 is provided with a portion 32 integral with and extending upwardly from a margin of the section 24, which portion 32 terminates in a flange 34 overlying the section 24. An internally threaded aperture 36 is provided through the upstanding portion 32 for accommodating a threaded shank portion 38 of a screw or bolt 40. It will be noted that the space between the sections 24 and 34 is less than the outside diameter of the threaded shank portion 38 and the maximum diameter of the threaded aperture 36. Thus, partial thread segments 42 and 44 are formed in the opposing surfaces of the sections 24 and 34. These thread segments are adapted to engage the screw shank 38 for increasing the ruggedness of the device and resisting stripping of the threads formed in the upstanding nut portion 32.

One end portion of the band 12 is connected with an end of the bolt 40. This is accomplished by wrapping an end portion of the band around a block 46 and then securing the block to the bolt. More specifically, the block 46 is provided with a central bearing aperture 48 adapted rotatively to receive a reduced diameter smooth portion 50 of the bolt member. Sections 52 and 54 of the band, which extend along opposite sides of the block 46, are also provided with bearing apertures rotatively receiving the portion 50 of the bolt shank. An outer terminal end 56 of the bolt shank portion 50 is upset in the manner shown for retaining the block 46 with the end portion of the band wrapped therearound on the bolt.

The block 46 is preferably formed so that it has a thickness several times greater than the thickness of the band 12 so as to provide a rugged connection between the band and the bolt, and so as to provide an elongated and more effective bearing for facilitating rotation of the bolt relative to the block and the associated end sections of the band.

The bracket member 20 and the band 12 are constructed so that an end portion of the band opposite from the end portion connected with the screw or bolt may be quickly, easily and securely fixed with respect to the bracket member. More specifically, a longitudinally extending series of apertures 58 is provided in the band for receiving protuberance means on the bracket member 20. This protuberance means includes a first short finger or projecting element 60 integral with the end section 22 and extending into the aperture 30. It is important to note that the protuberance means also include a projecting element 62 formed integrally with the end section 22 and spaced from, and facing outwardly or away from, the projecting element or finger 60. The element 62 also projects upwardly from the normal upper surface of the section 22 a distance substantially equal to the thickness of the band 12.

When applying the clamping device 10 to the hose 14 or any other suitable workpiece, the screw member is first retracted substantially to the position shown in Figs. 4 and 5. Then the free end portion of the band 12, opposite from the end thereof connected with the screw member, is looped around the workpiece and inserted through the aperture 30 in the bracket member 20. As will be understood, the length of the band, which is pulled through the aperture 30 in the bracket, may be varied in accordance with the diameter of the workpiece to which the clamp is to be applied. When the desired length of the band has been pulled through the bracket aperture, the free end portion of the band is manipulated and bent as shown in Fig. 4 so that the finger-like element 60 projects through one of the apertures 58. Then the free end portion of the band is folded down against the upper surface of the bracket end section 22 so that the protuberance 62 enters another of the apertures 58. The spacing between the protuberance 62 and the finger-like element 60 is such that when the free end portion of the band is folded to the position shown in Fig. 5, these protuberances or elements simultaneously engage margins of the associated apertures 58. This arrangement not only provides for a more secure and stronger connection between the band and the bracket member, but also prevents the free end portion of the band from twisting during the tightening operation.

After the preliminary assembly steps have been completed and the fastening device is in the condition shown in Fig. 5, it is merely necessary to turn the screw or bolt 40 so as to advance it to the position shown in Fig. 3 in order to tighten the band around the workpiece. It is to be noted that the construction of the bracket 20 base portion is such that the lower surface of the section 24 is offset from the upper or outer surface of the section 22 a distance substantially equal to, or slightly greater than, the thickness of the band 12 and the height of the protuberance 62. It is further to be noted that the screw member 40 is retained by the portion 32 and sections 24 and 34 of the bracket so that the shank 38 is disposed with its axis substantially parallel to the sections 22 and 24. Furthermore, the block 46 is constructed so that its lower edge is disposed in a plane adjacent the plane of the lower surface of the bracket section 24. As a result, a portion 64 of the band 12, extending from the inner margin 66 of the bracket section 24 to the block 26, will be disposed substantially tangentially to the hose or workpiece 14 when the clamping device is tightened as shown in Fig. 3. In addition, section 64 of the band will pass over the free end portion of the band which is engaged by the projecting elements 60 and 62. The construction is such that sliding frictional contact between the section 64 of the band and the free end portion of the band is minimized or substantially eliminated so that tightening of the clamping device is facilitated. At the same time, however, the section 64 of the band positively prevents the free end portion of the band from becoming disengaged from the protuberances or projections 60 and 62.

As indicated above, the intermediate sections 26 and 28 of the bracket member base portion conform generally to the surface of the hose. These sections are adapted to engage the hose adjacent the opposite margins of the aperture 30 and between areas 68 and 70 where the band extends away from the hose, as shown in Fig. 3. Thus, the sections 26 and 28 combine with the band to provide substantially circumferentially continuous clamping engagement with the hose.

While a preferred embodiment of the present invention has been shown and described herein, it is obvious that many structural details may be changed without departing from the spirit and scope of the appended claims.

The invention is claimed as follows:

1. A clamping device comprising an elongated flexible band having a predetermined thickness for substantially encircling a workpiece, and securing means connected with opposite end portions of said band for relatively shifting said portions in overlapping relationship for tightening the band around a workpiece, said securing means including a member comprising projecting means extending into aperture means in a first end portion of said band for anchoring said first end portion, said member including a section supporting said projecting means, said first end portion extending beneath and being bent around a margin of and extending over said section, said projecting means including an element projecting upwardly from said section, and screw means supported by and axially shiftable along a predetermined axis relative to said member and connected with a second portion of said band for advancing said second portion closely over and within a distance equal to said thickness from a part of said first end portion overlying said section and engaging said upwardly projecting element for positively retaining said first end portion in engagement with said projecting means without substantial interference between said portions, said second portion extending substantially straight throughout its length from and along a line tangent to an area of contact with a workpiece and above said first end portion so as to avoid undue frictional engagement with said first end portion, and said screw means axis being disposed substantially parallel to said second portion when said clamping device is applied to the workpiece.

2. A clamping device, as defined in claim 1, wherein said projecting means includes a second element projecting laterally from said margin of said section for further anchoring said first end portion and for preventing twisting of the band during appplication of the clamping device to a workpiece.

3. A clamping device comprising an elongated thin flexible band of predetermined width for substantially encircling a workpiece, a relatively thick and rigid sheet material member including laterally offset first and second sections disposed toward opposite ends of the member and a generally diagonally disposed intermediate portion extending between and connecting said sections, said member having an aperture therethrough wider than said band and having opposite ends respectively defined by inner margins of said first and second sections, nut means supported on said first section at a side thereof opposite from said diagonal portion, screw means threaded through said nut means and connected with one end portion of said band extending through said aperture for drawing said end portion through said aperture for tightening the band, a second end portion of said band also extending through said aperture and over said second section when the band is in a looped condition for substantially encircling a workpiece, said second band end portion having a pair of longitudinally spaced aperture means, a projecting element extending from said inner margin of said second section and having a width less than said predetermined width for entering one of said aperture means for anchoring said second end portion, and a second projecting element spaced on said second section from said first projecting element and extending upwardly and having a width less than said predetermined width for entering the other of said aperture means for further anchoring said second end portion and for resisting twisting of the band, said screw means being disposed for advancing said first mentioned end portion in a substantially straight line over and without undue frictional engagement with said second mentioned end portion for retaining said second mentioned end portion in engagement with said first and second mentioned projecting elements.

4. A clamping device, as defined in claim 3, wherein said nut means includes an upstanding section integral with said first section of said member and terminating in a laterally projecting flange overlying said first section, said screw means having an externally threaded shank having a predetermined outside diameter, said flange being spaced from said first section a distance slightly less than said outside diameter, and said nut means including internally threaded aperture means through said upstanding section and internal thread segments on opposing surfaces of said flange and said first section.

References Cited in the file of this patent

UNITED STATES PATENTS

| | | |
|---|---|---|
| 1,986,748 | Pritchard | Jan. 1, 1935 |
| 2,218,481 | Prochaska | Oct. 15, 1940 |
| 2,452,245 | Kollman | Oct. 26, 1948 |
| 2,622,290 | Schukraft | Dec. 23, 1952 |
| 2,817,136 | Zartler | Dec. 24, 1957 |

FOREIGN PATENTS

| | | |
|---|---|---|
| 175,641 | Great Britain | May 16, 1923 |